US008825825B2

(12) United States Patent
Kamble et al.

(10) Patent No.: US 8,825,825 B2
(45) Date of Patent: Sep. 2, 2014

(54) SNMP REQUEST PROCESSING WITHIN DISTRIBUTED DEVICE ARCHITECTURE

(75) Inventors: Keshav Kamble, Fremont, CA (US); Nandakumar Peethambaram, Santa Clara, CA (US); Dar-Ren Leu, San Jose, CA (US); Vijoy A. Pandey, San Jose, CA (US); Dayavanti G. Kamath, Santa Clara, CA (US); Sushma Anantharam, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 13/412,624

(22) Filed: Mar. 6, 2012

(65) Prior Publication Data
US 2013/0238771 A1    Sep. 12, 2013

(51) Int. Cl.
*G06F 15/173* (2006.01)

(52) U.S. Cl.
USPC ........................................................ 709/223

(58) Field of Classification Search
USPC ........................................................ 709/223
See application file for complete search history.

(56) References Cited

U.S. PATENT DOCUMENTS

| 5,561,769 | A | 10/1996 | Kumar et al. | |
|---|---|---|---|---|
| 5,805,816 | A * | 9/1998 | Picazo et al. ................ | 709/223 |
| 6,519,635 | B1 * | 2/2003 | Champlin et al. ........... | 709/223 |
| 6,546,415 | B1 | 4/2003 | Park | |
| 6,795,862 | B1 | 9/2004 | Keohane et al. | |
| 8,127,006 | B2 * | 2/2012 | Mongiovi ..................... | 709/224 |
| 8,352,600 | B2 * | 1/2013 | Calippe et al. ............... | 709/225 |
| 2003/0009543 | A1 * | 1/2003 | Gupta .......................... | 709/223 |
| 2004/0044744 | A1 * | 3/2004 | Grosner et al. .............. | 709/217 |
| 2004/0078419 | A1 * | 4/2004 | Ferrari et al. ................. | 709/201 |
| 2004/0158625 | A1 * | 8/2004 | Neale ........................... | 709/223 |
| 2005/0076112 | A1 * | 4/2005 | Ravindran et al. ........... | 709/224 |
| 2011/0185030 | A1 * | 7/2011 | Mongiovi ..................... | 709/208 |
| 2013/0201868 | A1 * | 8/2013 | Ghosh et al. ................. | 370/254 |

FOREIGN PATENT DOCUMENTS

| CN | 101795206 A | 8/2010 |
|---|---|---|
| KR | 20040058457 A | 7/2004 |

OTHER PUBLICATIONS

E.P. Duarte, Jr. et al., "Network fault management based on SNMP agent groups," Proceeding ICDCSW '01 Proceedings of the 21st International Conference on Distributed Computing Systems, year 2001.

(Continued)

*Primary Examiner* — Azizul Choudhury
*Assistant Examiner* — Tariq Najee-Ullah
(74) *Attorney, Agent, or Firm* — Feb Cabrasawan

(57) ABSTRACT

A distributed device architecture includes a master device and one or more member devices. A simple network management protocol (SNMP) agent of a master device receives an SNMP request from a managing device. Where the SNMP request pertains to a given member device, and where the SNMP request requires involvement of the given member device to fulfill the SNMP request, the master device generates a non-SNMP request corresponding to the SNMP request and transmits the non-SNMP request to the given member device. A non-SNMP agent of the given member device processes the non-SNMP request and transmits processing results back to the master device. The master device generates an SNMP response corresponding to the processing results, and the SNMP agent of the master device transmits the SNMP response back to the managing device.

15 Claims, 3 Drawing Sheets

(56) References Cited

OTHER PUBLICATIONS

A. Keller, "Systems management with distributed objects: porting SNMP agents to a CORBA environment," Proceedings of the 4th Workshop of the OpenView University Association: OVUA'97, Madrid, Spain, Apr. 1997.

J. Fei et al., "Novel hierarchical framework for the network management system based on multi-agent collaboration," Journal of Xidian University 2009 36 (2): 366-372 ISSN: 1001-2400: CN: 61-1076/TN, Mar. 31, 2009.

\* cited by examiner

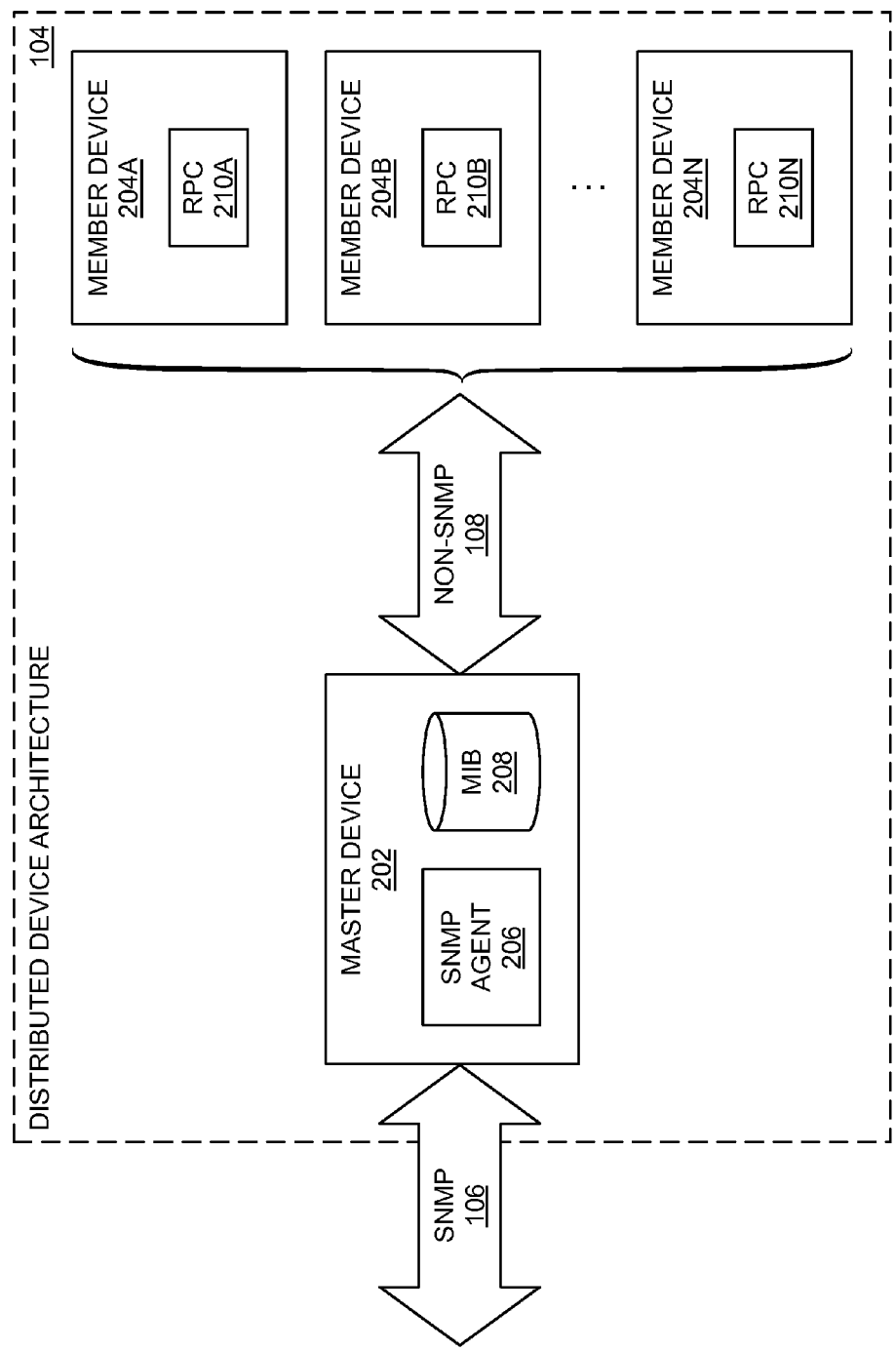

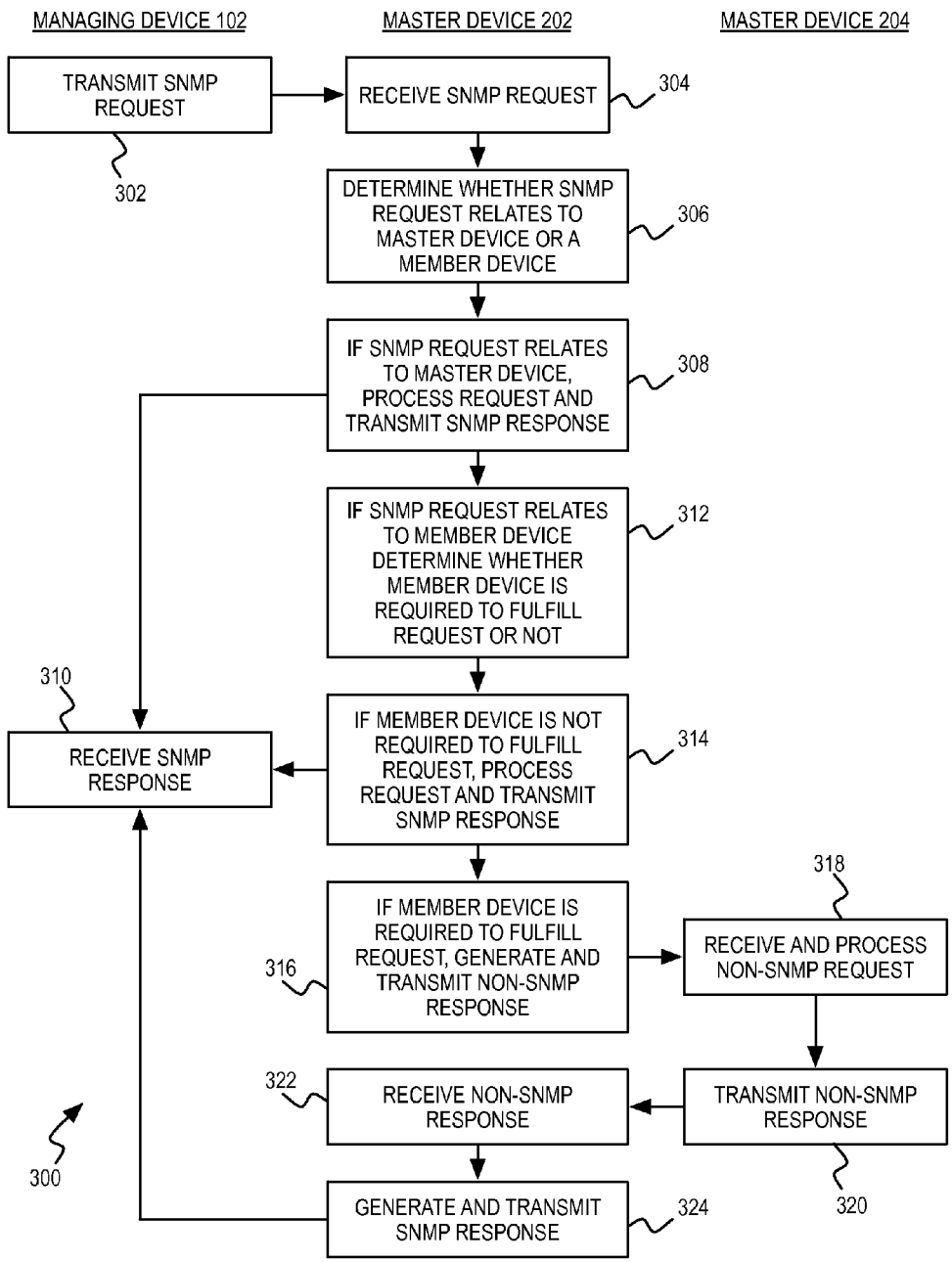

SNMP REQUEST PROCESSING WITHIN DISTRIBUTED DEVICE ARCHITECTURE

BACKGROUND

The simple network management protocol (SNMP) is an Internet-standard protocol for managing devices on Internet protocol (IP) networks. Devices that typically support the SNMP include routers, switches, servers, workstations, printers, and modem racks, among other types of devices. The SNMP is primarily used in network management systems to monitor network-attached devices for conditions that warrant administrative attention. The SNMP exposes management data in the form of variables on managed systems, which describe the system configuration. These variables can then be queried, and sometimes set, by managing devices.

SUMMARY

A method of an embodiment of the disclosure includes receiving a simple network management protocol (SNMP) request from a managing device by an SNMP agent of a master device of a distributed device architecture including one or more member devices in addition to the master device. The method includes determining by the master device whether the SNMP request pertains to a given member device of the member devices or whether the SNMP request pertains to the master device. The method includes, in response to determining that the SNMP request pertains to the given member device, determining by the master device whether the SNMP request requires involvement of the given member device to fulfill the SNMP request or whether the SNMP request does not require such involvement to fulfill the SNMP request. The method includes, in response to determining that the SNMP request requires involvement of the given member device to fulfill the SNMP request, generating by the master device a non-SNMP request corresponding to the SNMP request, and transmitting the non-SNMP request from the master device to the given member device.

A system of an embodiment of the disclosure implements a distributed device architecture. The system includes one or more member devices. Each member device has a non-SNMP agent to process non-SNMP requests to fulfill SNMP requests to which the non-SNMP requests correspond and that pertain to the member devices and that require involvement of the member devices to fulfill. The system includes a master device having an SNMP agent to receive the SNMP requests from a managing device, to generate the non-SNMP requests corresponding to the SNMP requests, and to transmit the SNMP requests to the member devices for receipt by the member devices. The distributed device architecture has a functionality that the member devices and the master device together provide.

A computer program product of an embodiment of the disclosure includes a computer-readable storage medium having computer-readable code embodied therein. The computer-readable code is executable by an SNMP agent of a master device of a distributed device architecture including one or more member devices in addition to the master device. The computer-readable code is executable to receive an SNMP request from a managing device. The SNMP request pertains to a given member device of the member devices and requires involvement of the given member device to fulfill the SNMP request. The computer-readable code is executable to generate a non-SNMP request corresponding to the SNMP request, and to transmit the non-SNMP request to the given member device.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 2 is a diagram of a distributed device architecture within which no SNMP communication occurs, according to an example of the disclosure.

FIG. 3 is a flowchart of a method for SNMP management of a distributed device architecture within which itself no SNMP communication occurs, according to an example of the disclosure.

DETAILED DESCRIPTION

Figure 1:
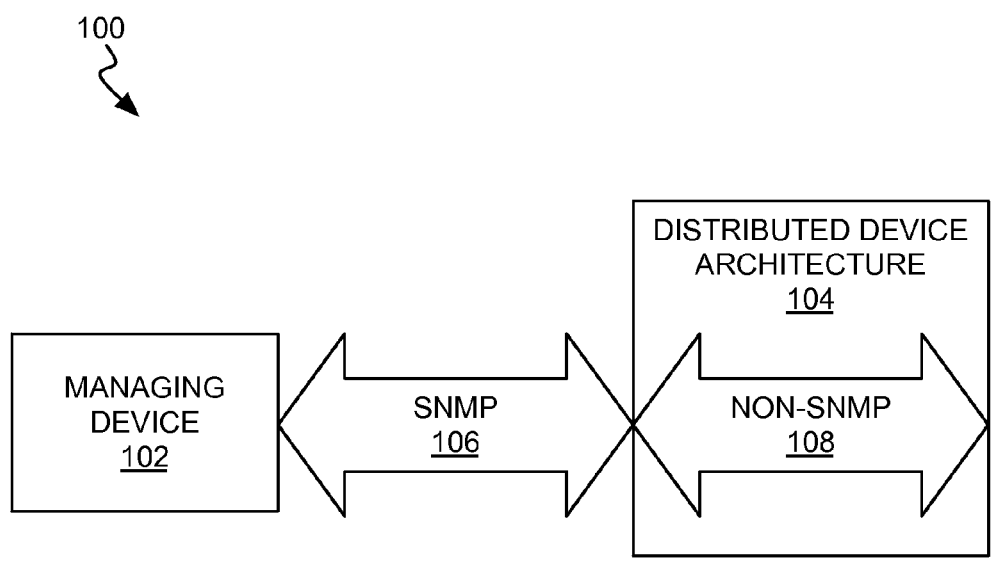
FIG. 1 is a diagram of a system in which simple network management protocol (SNMP) management occurs by a managing device in relation to a distributed device architecture, according to an example of the disclosure.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, the simple network management protocol (SNMP) provides for managing devices on networks. Traditionally, devices have been managed individually. However, more recently, devices are managed on a distributed architecture basis. For instance, a number of devices may constitute a distributed device architecture that is desirably managed as a single device on the network. The processing that the SNMP affords should thus occur for the distributed device architecture as a whole.

However, existing approaches to employing the SNMP in conjunction with a distributed device architecture still to some extent require management at the level of each device that makes up the architecture in question. For example, a distributed device architecture may provide for network switch functionality. The architecture may include a master device and one or more member devices that together provide this functionality. Ideally, management of the distributed device architecture should occur at the architectural level, without knowledge of the devices making up the architecture.

However, in actuality, management of such a distributed device architecture via the SNMP still to some extent requires knowledge of the underlying constitution of the architecture. A managing device may send to the master device of a distributed device architecture an SNMP request intended for a member device of the architecture. The master device effectively acts as a proxy, forwarding the SNMP request to the member device, and forwarding the SNMP response from the member device back to the managing device that sent the initial request.

Besides requiring the managing device to have some knowledge and awareness of the makeup of the distributed device architecture, this management approach via the SNMP has other disadvantages. The SNMP is a relatively high-latency and unreliable protocol. Insofar as SNMP requests have to be forwarded within a distributed device architecture, utilization of the SNMP in conjunction with such an architecture heightens these disadvantages. Furthermore, the SNMP requires an SNMP agent at each device that is to respond to SNMP requests.

Techniques disclosed herein overcome these and other disadvantages associated with using the SNMP to manage a distributed device architecture having a master device and one or more member devices. The master device receives SNMP requests from a managing device, and returns SNMP responses back to the managing device. However, master device-to-member device communication is achieved in conjunction with a lower latency and more reliable protocol than the SNMP, such as an enhanced layer two transport (EL2T)-based protocol.

Overhead is also reduced, because an SNMP agent is not required at each of the devices within the distributed device architecture. Just the master device within the architecture has an SNMP agent; the member devices do not. Furthermore, the managing device that issues the SNMP requests and receives SNMP responses in return does not have to know the composition of the distributed device architecture. The managing device does not have to be aware that the "device" with which it is communicating is implemented as an architecture of a multiple distributed devices.

FIG. 1 shows a system 100 in which SNMP management occurs by a managing device 102 in relation to a distributed device architecture 104, according to an example of the disclosure. The managing device 102 communicates with the distributed device architecture 104 over a network, such as the Internet, an intranet, an extranet, and so on. The managing device 102 may be a client computing device, like a laptop or desktop computer, by which a network administrator manages and administers the distributed device architecture 104.

The distributed device architecture 104 is a multiple-device architecture that together performs a predetermined functionality, like network switch functionality, which is usually afforded by a single device. The managing device 102 communicates with the distributed device architecture 104 as if it were just one device and not multiple devices. The managing device 102 may not be aware that the distributed device architecture 104 is even made up of multiple devices in this respect.

Communication 106 between the managing device 102 and the distributed device architecture 104 occurs using the SNMP. Therefore, the managing device 102 sends management requests to, and receives corresponding receives from, the distributed device architecture 104 no differently than it does with any device that it manages via the SNMP. From the perspective of the managing device 102, in other words, the techniques disclosed herein for SNMP management of the distributed device architecture 104 are largely if not completely transparent.

However, communication 108 within the distributed device architecture 104 occurs without using the SNMP. Therefore, within the distributed device architecture 104, no SNMP communication occurs among the multiple devices of the architecture 104. Rather, a different protocol, such as an EL2T-based protocol, is employed. As such, latency, overhead, and unreliability owing to the SNMP do not occur within the distributed device architecture 104 itself.

FIG. 2 shows the distributed device architecture 104 in detail, according to an example of the disclosure. The distributed device architecture 104 includes a master device 202 and one or more member devices 204. As depicted in FIG. 2, the member devices 204 can include member devices 204A, 204B, . . . , 204N. The devices 202 and 204 can be general purpose or specialized computing devices that each includes a processor, memory, storage devices, and other hardware.

As depicted in FIG. 2, the SNMP communication 106 occurs to the master device 202 of the distributed device architecture 104, but not within the distributed device architecture 104 itself. That is, the SNMP communication 106 terminates (or originates) at the master device 202 as the device that sends and receives management communication external to the distributed device architecture 104. Within the distributed device architecture 104, by comparison, the non-SNMP communication 108 occurs, specifically between the master device 202 and the member devices 204. No SNMP communication occurs between the master device 202 and the member devices 204.

The master device 202 includes an SNMP agent 206 and an SNMP management information base (MIB) 208. The SNMP agent 206 fields SNMP requests within the SNMP communication 106 and returns SNMP responses within the SNMP communication 106. The SNMP agent 206 is software running on the hardware of the master device 202. The SNMP agent 206 also may generate non-SNMP requests for transmission within the non-SNMP communication 108 and that correspond to the SNMP requests, and may generate SNMP responses from non-SNMP responses received within the non-SNMP communication 108.

The MIB 208 is a database that stores SNMP management information for all the devices 202 and 204 within the distributed device architecture 104. The SNMP agent 206 when possible retrieves information from the MIB 208 to respond to SNMP requests within the SNMP communication 106. The SNMP agent 206 is also responsible for maintaining the MIB 208, including storing and updating information regarding the member devices 204 (and regarding the master device 202) within the MIB 208.

The member devices 204 do not include SNMP agents, such that the SNMP agent 206 of the master device 202 is the only SNMP agent within the distributed device architecture 104. Rather, the member devices 204 include remote procedure calls (RPCs) 210A, 210B, . . . , 210N, respectively. Each member device 204 thus includes an RPC 210. The RPCs 210 are more generally non-SNMP agents, and are software running on the hardware of the member devices 204.

The RPCs 210 receive within the non-SNMP communication 108 non-SNMP requests from the master device 202. The RPCs 210 generate non-SNMP responses and send these responses back to the master device 202 within the non-SNMP communication 108. For instance, where the MIB 208 does not store the SNMP management information requested within an SNMP request, the master device 204 generates a non-SNMP request for this information and transmits it to the appropriate member device 204. The member device 204 returns the requested information in a non-SNMP response, on which basis the master device 202 generates an SNMP response.

FIG. 3 shows a method 300 for performing SNMP management in relation to the distributed device architecture 104, where no SNMP communication occurs within the architecture 104 itself, according to an example of the disclosure. Parts of the method 300 in the left column are performed by the managing device 102. Parts of the method 302 in the center column are performed by the master device 202, such as by the SNMP agent 206 with reference to the MIB 208. Parts of the method 300 in the right column are performed by a member device 204, such as by the RPC 210 thereof (i.e., the non-SNMP agent thereof).

The managing device 102 transmits an SNMP request to the master device 202 (302), which the master device 202 receives (304). The SNMP request may be an SNMP get request or an SNMP set request, for instance. An SNMP get request requests information regarding the distributed device architecture 104 that may be static or dynamic in nature. For example, where the distributed device architecture 104 provides network device functionality, static information may include the currently assigned network address of the architecture 104. While this information does change periodically, it changes infrequently enough to be considered static information.

Dynamic information in this example may include the state of a network port of the distributed device architecture 104. The state of the network port may be whether the network port is connected to another device and currently transmitting data, whether the port is connected to another device but is not currently transmitting data, whether the port is not connected to another device, and so on. This information, particularly whether the port is currently transmitting data or not, can change frequently enough to be considered dynamic information.

An SNMP set request sets information regarding the distributed device architecture 104. Information that can be set regarding the distributed device architecture 104 may include configuration parameters, for instance. For example, where the distributed device architecture 104 provides network device functionality, parameters that can be set may include the currently assigned network address of the architecture 104.

The master device 202 determines whether the SNMP request relates to the master device 202 itself or to a member device 204 (306). As noted above, the managing device 102 may not be aware that the distributed device architecture 104 is not a single device, and as such, sends an SNMP request related to the architecture 104 generally. However, the SNMP request may be more specifically related to just one of the devices 202 and 204 making up the distributed device architecture 104.

For example, where the distributed device architecture 104 provides network device functionality, the SNMP request may request the current state of a particular network port of the architecture 104. The master device 202 can refer to a map to determine of which device 202 or 204 the network port in question is physically a part. As another example, the SNMP request may request the currently assigned network address of the distributed device architecture 104. This requested information pertains to the distributed device architecture 104 as a whole, but insofar as the master device 202 can process this request without involving any of the member devices 204, the information is said to relate to the master device 202.

If the SNMP request relates to the master device 202, the master device 202 processes the request and transmits an SNMP response including the processing results back to the managing device 102 (308), which receives the SNMP response (310), and ending the method 300. The master device 202 may refer to the MIB 208 to process the SNMP request. The master device 202 in part 308 does involve any of the member devices 204. Part 308 encompasses the scenario in which the information that is the subject of the SNMP request is particular to just the master device 202. Part 308 also encompasses the scenario in which this information is with respect to the distributed device architecture 104 as a whole but in which the master device 202 does not require any member device 204 to assist in processing the request.

By comparison, if the SNMP request relates to a member device 204, the master device 202 determines whether the member device 204 is required to be involved to fulfill the request or not (312). Even though the SNMP request relates to a member device 204, in at least some situations the master device 202 does not require the involvement of the member device 204 to fulfill the request. For example, whether a particular network port on a member device 204 is in a state of failure may be information that the master device 202 can determine by looking up in the MIB 208 without involving the member device 204. By comparison, whether the network port is currently transmitting data or not may be information that the master device 202 has to acquire by polling the member device 204 itself.

Therefore, if the member device 204 to which the SNMP request relates is not required to fulfill the request, then the master device 202 processes the SNMP request by itself without involving the member device 204 in question, and transmits an SNMP response including the processing results back to the managing device 102 (314). The member device 204 may process the request by reading from or writing to the MIB 208. The managing device 102 receives the SNMP response (310). As such, the method 300 is finished as to the SNMP request originally transmitted by the managing device 102.

However, if the member device 204 to which the SNMP request is required to fulfill the request, then the master device 202 generates and transmits a corresponding non-SNMP request (316). The non-SNMP request may be in the form of a call to the RPC 210 of the member device 204 in question. More generally, the non-SNMP request relates to the same information as the SNMP request does, but in accordance with a protocol other than the SNMP. For instance, as alluded to above, the information may be requested within a packet in accordance with an EL2T-based protocol, or another non-SNMP.

The member device 204 receives the non-SNMP request and processes the non-SNMP request (318). For example, where the non-SNMP agent is an RPC 210, the member device 204 receives the non-SNMP request by virtue of the master device 202 calling its RPC 210. In response, the member device 204 processes the non-SNMP request, by determining the information requested in the request, or by setting the parameter specified in the request, for instance. The member device 204 transmits the results of processing the non-SNMP request in a non-SNMP response back to the master device 202 (320), such as within a packet in accordance with an EL2T-based protocol.

The master device 202 receives the non-SNMP response from the member device 204 (322). The master device 202 then generates an SNMP response including the processing results encapsulated within the non-SNMP response, and transmits the SNMP response to the managing device 102 (324). The managing device receives the SNMP response (310), as before, which ends the method 300.

The method 300 thus permits a managing device 102 to manage the distributed device architecture 104 in accordance with the SNMP, but provides for such SNMP management that does not involve SNMP communication within the architecture 104 itself. Therefore, disadvantages associated with the SNMP do not occur as a result of communication the distributed device architecture 104 itself. Rather, the master device 202 and the member device 204 communicate with one another in a non-SNMP manner.

The sole SNMP agent within the distributed device architecture 104 can be the SNMP agent 206 at the master device 202. Similarly, there do not have to be multiple MIBs within the distributed device architecture 104, but rather just a single MIB 208 at the master device 202. The managing device 102 can be unaware that the distributed device architecture 104 includes multiple devices 202 and 204, and is not a single device providing the functionality of the architecture 104.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:

maintaining, by a master device of a distributed device architecture comprising one or more member devices in addition to the master device, a management information base (MIB) for the distributed device architecture, including for the master device and for the member devices, where the MIB is an only MIB of the distributed device architecture, such that none of the member devices includes a MIB;

receiving a simple network management protocol (SNMP) request from a managing device by an SNMP agent of the master device;

after receiving the SNMP request, determining by the master device whether the SNMP request pertains to a given member device of the member devices or whether the SNMP request pertains to the master device;

in response to determining that the SNMP request pertains to the given member device, determining by the master device whether the SNMP request requires involvement of the given member device to fulfill the SNMP request or whether the SNMP request does not require involvement of the given member device to fulfill the SNMP request;

in response to determining that the SNMP request requires involvement of the given member device to fulfill the SNMP request, generating by the master device a non-SNMP request corresponding to the SNMP request, and then transmitting the non-SNMP request from the master device to the given member device;

receiving the non-SNMP request by a non-SNMP agent of the given member device;

in response to receiving the non-SNMP request by the non-SNMP agent of the given member device from the master device,
  processing the non-SNMP request by the non-SNMP agent of the given member device;
  after processing the non-SNMP request, directly transmitting results of processing the non-SNMP request from the given member device to the master device;
  receiving the results of processing the non-SNMP request by the master device directly from the given member device;
  in response to receiving the results of processing the non-SNMP request by the master device from the given member device,
    generating by the master device an SNMP response corresponding results of processing the non-SNMP request; and
    after generating the SNMP response, transmitting the SNMP response from the SNMP agent of the master device to the managing device, wherein the SNMP agent of the master device is an only SNMP agent of the distributed device architecture, such that none of the member devices include an SNMP agent.

2. The method of claim 1, wherein the non-SNMP agent of the given member device is a remote procedure call (RPC) at the given member device.

3. The method of claim 1, wherein the results of processing the non-SNMP request are encapsulated in an enhanced layer two transport (EL2T)-based packet.

4. The method of claim 1, further comprising, in response to determining that the SNMP request does not require involvement of the given member device to fulfill the SNMP request, even though the SNMP request pertains to the given member device:

processing the SNMP request by the SNMP agent of the master device in relation to the MIB maintained at the master device for the distributed device architecture, including for the master device and for the member devices; and transmitting results of processing the SNMP request from the SNMP agent of the master device to the managing device.

5. The method of claim 1, further comprising, in response to determining that the SNMP request pertains to the master device:

processing the SNMP request by the SNMP agent of the master device in relation to the MIB maintained at the master device for the distributed device architecture, including for the master device and for the member devices; and transmitting results of processing the SNMP request from the SNMP agent of the master device to the managing device.

6. The method of claim 1, wherein the managing device communicates with the distributed device architecture as a single device, such that the managing device is unaware that the distributed device architecture includes a plurality of devices including the master device and the member devices.

7. The method of claim 1, wherein the non-SNMP request is encapsulated in an enhanced layer two transport (EL2T)-based packet.

8. The method of claim 1, wherein the SNMP request is one of an SNMP GET request and an SNMP SET request.

9. The method of claim 1, wherein the distributed device architecture implements a networking switch.

10. A system implementing a distributed device architecture and comprising:

one or more member devices, each member device having a non-simple network management protocol (SNMP) agent to process non-SNMP requests to fulfill SNMP requests to which the non-SNMP requests correspond and that pertain to the member devices and that require involvement of the member devices to fulfill;

a master device having an SNMP agent to receive the SNMP requests from a managing device, to generate the non-SNMP requests corresponding to the SNMP requests, and to transmit the SNMP requests to the member devices for receipt by the member devices;

a management information base (MIB) for the distributed device architecture, including for the master device and for the member devices, where the MIB is an only MIB of the distributed device architecture and is maintained by the master device, such that none of the member devices includes a MIB, wherein the distributed device architecture has a functionality that the member devices and the master device together provide, wherein the non-SNMP agents of the member devices, in response to receiving the non-SNMP requests from the master device, are to directly transmit to the master device for receipt by the master device results of processing the non-SNMP requests, wherein the SNMP agent of the master device, in response to receiving the results of processing the non-SNMP requests directly from the non-SNMP agents of the member devices, is to generate SNMP responses corresponding to the results of processing the non-SNMP requests and is to transmit the SNMP responses to the managing device, and wherein the SNMP agent of the master device is an only SNMP agent of the distributed device architecture, such that none of the member devices include an SNMP agent.

11. The system of claim 10, wherein the SNMP requests are first SNMP requests, and wherein the SNMP agent of the master device is to receive second SNMP requests that pertain to the member devices but that do not require involvement of the member devices to fulfill, is to process the second SNMP requests in relation to the MIB maintained at the master device for the distributed device architecture, and is to transmit results of processing the second SNMP requests to the managing device.

12. The system of claim 10, wherein the SNMP requests are first SNMP requests, and wherein the SNMP agent of the master device is to receive second SNMP requests that do not pertain to the member devices but rather that pertain to the master device, is to process the second SNMP requests in relation to the MIB maintained at the master device for the distributed device architecture, and is to transmit results of processing the second SNMP requests to the managing device.

13. The system of claim 10, wherein the managing device communicates with the distributed device architecture as a single device, such that the managing device is unaware that the distributed device architecture includes a plurality of devices including the master device and the member devices.

14. The system of claim 10, wherein the non-SNMP agent of each member device is a remote procedure call (RPC), the non-SNMP requests are encapsulated in enhanced layer two transport (EL2T)-based packets, and results of processing the non-SNMP requests are encapsulated in other EL2T-based packets.

15. A computer program product comprising:

a storage device storing computer-readable code executable by a simple network management protocol (SNMP) agent of a master device of a distributed device architecture comprising one or more member devices in addition to the master device to:

maintain a management information base (MIB) for the distributed device architecture, including for the master device and for the member devices, where the MIB is an only MIB of the distributed device architecture, such that none of the member devices includes a MIB;

receive an SNMP request from a managing device, the SNMP request pertaining to a given member device of the member devices and requiring involvement of the given member device to fulfill the SNMP request;

after receiving the SNMP request, generate a non-SNMP request corresponding to the SNMP request;

after generating the non-SNMP request, transmit the non-SNMP request to the given member device;

after transmitting the non-SNMP request, subsequently receive, directly from a non-SNMP agent of the given member device, results of processing the non-SNMP request by the non-SNMP agent;

in response to receiving the results of processing the non-SNMP request from the non-SNMP agent of the given member device, generate an SNMP response corresponding to the results of processing the non-SNMP request; and after generating the SNMP response, transmit the SNMP response to the managing device, wherein the SNMP agent of the master device is an only SNMP agent of the distributed device architecture, such that none of the member devices include an SNMP agent.

* * * * *